United States Patent
Park et al.

(10) Patent No.: US 12,034,816 B2
(45) Date of Patent: Jul. 9, 2024

(54) DIGITAL FOOTPRINT VISUAL NAVIGATION

(71) Applicant: Allstate Insurance Company, Northbrook, IL (US)

(72) Inventors: Jason Park, Chicago, IL (US); Nicolette deGuia, Chicago, IL (US); Mark Hansen, Buffalo Grove, IL (US); Dongmin Liu, Northbrook, IL (US); Amaeya Kalke, Northbrook, IL (US); Sergio Gutierrez Montero, Northbrook, IL (US); John Parkinson, Wheaton, IL (US); Cindy Weidmann, Northbrook, IL (US)

(73) Assignee: ALLSTATE INSURANCE COMPANY, Northbrook, IL (US)

( * ) Notice: Subject to any disclaimer, the term of this patent is extended or adjusted under 35 U.S.C. 154(b) by 0 days.

(21) Appl. No.: 18/313,458

(22) Filed: May 8, 2023

(65) Prior Publication Data
US 2023/0283679 A1    Sep. 7, 2023

Related U.S. Application Data

(63) Continuation of application No. 17/126,375, filed on Dec. 18, 2020, now Pat. No. 11,683,383, which is a (Continued)

(51) Int. Cl.
*H04L 67/306*    (2022.01)
*G06Q 40/02*    (2023.01)
(Continued)

(52) U.S. Cl.
CPC .......... *H04L 67/306* (2013.01); *G06Q 40/02* (2013.01); *H04L 51/046* (2013.01); *H04L 63/1416* (2013.01); *H04L 67/535* (2022.05)

(58) Field of Classification Search
CPC ........... H04L 67/30–306; H04L 67/535; H04L 51/046; H04L 64/1416; G06Q 40/02
See application file for complete search history.

(56) References Cited

U.S. PATENT DOCUMENTS 6,832,245 B1 *  12/2004  Isaacs .................... H04L 51/42
                                                      709/206
8,230,036 B2    7/2012   Ishikawa et al.
(Continued)

FOREIGN PATENT DOCUMENTS

CN    104579926 B    12/2017

OTHER PUBLICATIONS

Sai Peddinti, et al., "Finding Sensitive Accounts on Twitter: An Automated Approach Based on Follower Anonymity", 2016, Proceedings of the Tenth International AAAI Conference on Web and Social Media (ICWSM 2016), pp. 655-658 (Year: 2016).
(Continued)

*Primary Examiner* — Jonathan A Bui
(74) *Attorney, Agent, or Firm* — Akerman LLP

(57) ABSTRACT

Methods, computer-readable media, software, and apparatuses may assist the user in understanding their unique digital footprint and the connections from the data within the footprint to the user's connections online and in the physical world. The determined information may be visually displayed to the user along with recommendations regarding digital safety.

19 Claims, 7 Drawing Sheets

Related U.S. Application Data continuation of application No. 16/359,145, filed on Mar. 20, 2019, now Pat. No. 10,887,425.

(51) Int. Cl.
*H04L 9/40* (2022.01)
*H04L 51/046* (2022.01)
*H04L 67/50* (2022.01)

(56) References Cited

U.S. PATENT DOCUMENTS

| | | | |
|---|---|---|---|
| 8,880,528 | B2 | 11/2014 | Houston et al. |
| 8,935,616 | B2* | 1/2015 | Hickman ............... H04L 65/403 715/766 |
| 9,154,514 | B1* | 10/2015 | Prakash ............... G06Q 10/107 |
| 9,258,264 | B1 | 2/2016 | Shoham et al. |
| 2005/0198131 | A1* | 9/2005 | Appelman ........... H04L 61/4594 709/204 |
| 2009/0030884 | A1* | 1/2009 | Pulfer ................. H04N 1/00212 |
| 2009/0063467 | A1 | 3/2009 | Abhyanker |
| 2009/0265757 | A1* | 10/2009 | Light ..................... G06Q 10/10 709/224 |
| 2010/0017476 | A1 | 1/2010 | Shue et al. |
| 2010/0223341 | A1* | 9/2010 | Manolescu ............. H04L 51/02 709/224 |
| 2010/0299716 | A1* | 11/2010 | Rouskov ............... H04L 63/105 726/1 |
| 2011/0214069 | A1 | 9/2011 | Jung et al. |
| 2012/0089690 | A1* | 4/2012 | Hein .................... G06Q 10/107 709/206 |
| 2012/0131107 | A1* | 5/2012 | Yost ...................... H04L 51/212 709/206 |
| 2012/0166282 | A1* | 6/2012 | Reis ................... G06Q 30/0261 705/14.55 |
| 2012/0246720 | A1* | 9/2012 | Xie ....................... H04L 51/212 726/22 |
| 2013/0179516 | A1 | 7/2013 | Tsai et al. |
| 2013/0198811 | A1* | 8/2013 | Yu ........................... H04L 63/08 726/4 |
| 2014/0046983 | A1 | 2/2014 | Galloway et al. |
| 2014/0237570 | A1 | 8/2014 | Shishkov et al. |
| 2015/0312262 | A1* | 10/2015 | Doshi .................. H04L 67/535 726/1 |
| 2016/0119376 | A1* | 4/2016 | Scozzaro ............ H04L 63/1483 726/22 |
| 2016/0132198 | A1* | 5/2016 | Sinclair ................. G06Q 50/01 715/739 |
| 2017/0085691 | A1 | 3/2017 | Kim et al. |
| 2017/0187753 | A1* | 6/2017 | Brisebois ................ H04L 63/20 |
| 2017/0322947 | A1* | 11/2017 | Subramanian ........ G06F 16/437 |
| 2018/0048595 | A1* | 2/2018 | Dotan-Cohen ......... H04L 51/08 |
| 2018/0189356 | A1 | 7/2018 | Chafourifar et al. |
| 2018/0253219 | A1* | 9/2018 | Dotan-Cohen ..... G06F 3/04847 |
| 2018/0315062 | A1 | 11/2018 | Parekh et al. |
| 2018/0322461 | A1 | 11/2018 | Subedi et al. |
| 2018/0365627 | A1 | 12/2018 | Mansour et al. |
| 2018/0365696 | A1 | 12/2018 | Yan et al. |
| 2019/0052724 | A1* | 2/2019 | Dancel .................. H04L 63/107 |
| 2019/0178657 | A1 | 6/2019 | Benbrahim et al. |
| 2019/0303604 | A1* | 10/2019 | Wijesundera ......... H04L 9/0631 |
| 2019/0311430 | A1* | 10/2019 | Raleigh ................ G06Q 40/03 |
| 2020/0065814 | A1 | 2/2020 | Fang et al. |
| 2020/0110750 | A1 | 4/2020 | Joseph et al. |

OTHER PUBLICATIONS

Apr. 20, ?020—(U.S.) Non-Final Office Action—U.S. Appl. No. 16/359,145.
May 1, ?020—(WO) International Search Report & Written Opinion—PCT/US20/22923.
Sep. 3, 2020—(U.S.) Notice of Allowance—U.S. Appl. No. 16/359,145.

* cited by examiner

302 Acquaintances

400

304 Friends

306 Best Friends

| | Population Size | Highest | Population Size | Moderate | Population Size | Small |
|---|---|---|---|---|---|---|
| | Types of shared information | superficial | Types of shared information | Superficial, sensitive | Types of shared information | Superficial, sensitive |
| 402 | Sensitivity of information shared | Low | Sensitivity of information shared | Moderate | Sensitivity of information shared | High |
| | Regularity of conversations | Regular | Regularity of conversations | Regular/occasional | Regularity of conversations | Regular/occasional |
| 404 | Direction of conversations | Single direction | Direction of conversations | Bi-direction | Direction of conversations | Bi-direction |
| | Conversation channels | In-person, email, phone and letter | Conversation channels | In-person, email, phone, text, letter, chat, IM, video | Conversation channels | In-person, email, phone, text, letter, chat, IM, video |

DIGITAL FOOTPRINT VISUAL NAVIGATION

CROSS-REFERENCE TO RELATED APPLICATIONS

This application is a continuation of U.S. application Ser. No. 17/126,375 filed Dec. 18, 2020, which a continuation of U.S. application Ser. No. 16/359,145, filed Mar. 20, 2019, now U.S. Pat. No. 10,887,425 issued on Jan. 5, 2020, the disclosures of which are hereby incorporated in their entirety by reference herein.

TECHNICAL FIELD

The disclosure relates to methods, apparatus, and systems for the generating and displaying a user's digital footprint. In addition, the disclosure assists the user in understanding and displaying their unique digital footprint and the connections from the data within the footprint to the user's connections online and in the physical world.

BACKGROUND

A user's digital footprint may be extensive, complex and ever evolving. The digital footprint may include multiple maps and a history component. The maps illustrate representations of where information is, organized in any of several ways. For instance, the organization may include use of multiple sets of metadata and classification schemes. The history component may allow a user to retrace the evolution of any element within the footprint or the footprint as a whole, back through time. In addition to the actual data about the individual information, additional information regarding how the data was acquired, what the information might be or has been used for, and information regarding the accuracy of the data may also be included with the user's digital footprint.

All of this data is overwhelming and may not be easily understood by the user. Presenting this information to a user in an intuitive, easy to use and convenient form that can be accessed via any online device, including but not limited to mobile phone, tablet, personal computer or smart television is challenging.

SUMMARY

In light of the foregoing background, the following presents a simplified summary of the present disclosure in order to provide a basic understanding of some aspects of invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure address one or more of the issues mentioned above by disclosing methods, computer readable storage media, software, systems, and apparatuses to assist a user in understanding their unique digital footprint and the connections from the data within the footprint to the user's connections online and in the physical world. The determined information may be visually displayed to the user along with recommendations regarding digital safety. The digital safety visual navigation system integrates appealing and easy to understand visual metaphors, information representations and navigation modes that may include browse, search, and actions such as tap to select, spin, swipe, stretch to expand, pinch to compress, and others that solve this challenge.

Of course, the methods and systems of the above-referenced embodiments may also include other additional elements, steps, computer-executable instructions, or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example and is not limited by the accompanying figures in which like reference numerals indicate similar elements and in which:

FIG. 4 illustrates an expanded exemplary relationship framework in accordance with an embodiment of the disclosure.

DETAILED DESCRIPTION

In accordance with various aspects of the disclosure, methods, computer-readable media, software, and apparatuses are disclosed for generating and displaying a user's digital footprint. In the following description of the various embodiments of the disclosure, reference is made to the accompanying drawings, which form a part hereof, and in which is shown by way of illustration, various embodiments in which the disclosure may be practiced. It is to be understood that other embodiments may be utilized and structural and functional modifications may be made.

Figure 1:
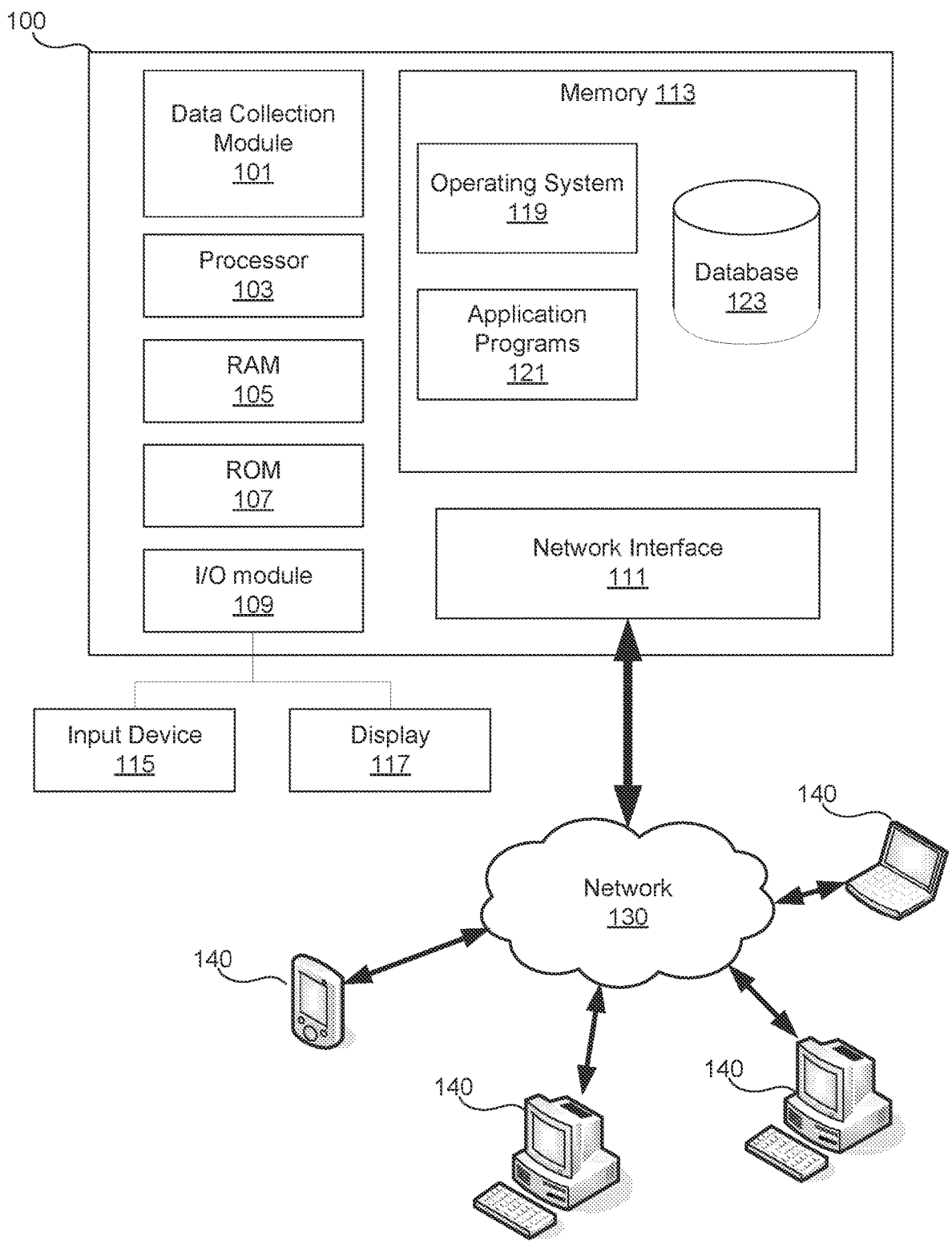
FIG. 1 illustrates an example visual navigation device that may be used in accordance with one or more aspects described herein.

In one or more arrangements, aspects of the present disclosure may be implemented with a computing device. FIG. 1 illustrates a block diagram of an example visual navigation device 100 that may be used in accordance with aspects described herein. The visual navigation device 100 may be a computing device, such as a personal computer (e.g., a desktop computer), server, laptop computer, notebook, tablet, smartphone, mobile phone, vehicles, home management devices, home security devices, smart appliances, etc. The visual navigation device 100 may have a data collection module 101 for retrieving and/or analyzing data as described herein. The data collection module 101 may be implemented with one or more processors and one or more storage units (e.g., databases, RAM, ROM, and other computer-readable media), one or more application specific integrated circuits (ASICs), and/or other hardware components (e.g., resistors, capacitors, power sources, switches, multiplexers, transistors, inverters, etc.). Throughout this disclosure, the data collection module 101 may refer to the software and/or hardware used to implement the data collection module 101. In cases where the data collection module 101 includes one or more processors, such processors may be specially configured to perform the processes disclosed herein. Additionally, or alternatively, the data collection module 101 may include one or more processors configured to execute computer-executable instructions, which may be stored on a storage medium, to perform the processes disclosed herein. In some examples, visual navigation device 100 may include one or more processors 103 in addition to, or instead of, the data collection module 101. The processor(s) 103 may be configured to operate in conjunction with data collection module 101. Both the data collection module 101 and the processor(s) 103 may be capable of controlling operations of the visual navigation device 100 and its associated components, including RAM 105, ROM 107, an input/output (I/O) module 109, a network interface 111, and memory 113. For example, the data collection module 101 and processor(s) 103 may each be configured to read/write computer-executable instructions and other values from/to the RAM 105, ROM 107, and memory 113.

The I/O module 109 may be configured to be connected to an input device 115, such as a microphone, keypad, keyboard, touchscreen, and/or stylus through which a user of the visual navigation device 100 may provide input data. The I/O module 109 may also be configured to be connected to a display device 117, such as a monitor, television, touchscreen, etc., and may include a graphics card. The display device 117 and input device 115 are shown as separate elements from the visual navigation device 100; however, they may be within the same structure. On some visual navigation devices 100, the input device 115 may be operated by users to interact with the data collection module 101, including providing user information and/or preferences, device information, account information, warning/suggestion messages, etc., as described in further detail below. System administrators may use the input device 115 to make updates to the data collection module 101, such as software updates. Meanwhile, the display device 117 may assist the system administrators and users to confirm/appreciate their inputs.

The display device 117 may be configured to display 3D images and virtual reality (VR) head mounted images. In addition, display device 117 may also be used for augmented reality overlays.

The memory 113 may be any computer-readable medium for storing computer-executable instructions (e.g., software). The instructions stored within memory 113 may enable the visual navigation device 100 to perform various functions. For example, memory 113 may store software used by the visual navigation device 100, such as an operating system 119 and application programs 121, and may include an associated database 123.

The network interface 111 may allow the visual navigation device 100 to connect to and communicate with a network 130. The network 130 may be any type of network, including a local area network (LAN) and/or a wide area network (WAN), such as the Internet, a cellular network, or a satellite network. Through the network 130, the visual navigation device 100 may communicate with one or more other computing devices 140, such as laptops, notebooks, smartphones, tablets, personal computers, servers, vehicles, home management devices, home security devices, smart appliances, etc. The computing devices 140 may also be configured in a similar manner as visual navigation device 100. In some embodiments, the visual navigation device 100 may be connected to the computing devices 140 to form a "cloud" computing environment.

The network interface 111 may connect to the network 130 via communication lines, such as coaxial cable, fiber optic cable, etc., or wirelessly using a cellular backhaul or a wireless standard, such as IEEE 802.11, IEEE 802.15, IEEE 802.16, etc. In some embodiments, the network interface may include a modem. Further, the network interface 111 may use various protocols, including TCP/IP, Ethernet, File Transfer Protocol (FTP), Hypertext Transfer Protocol (HTTP), etc., to communicate with other computing devices 140.

Figure 2:
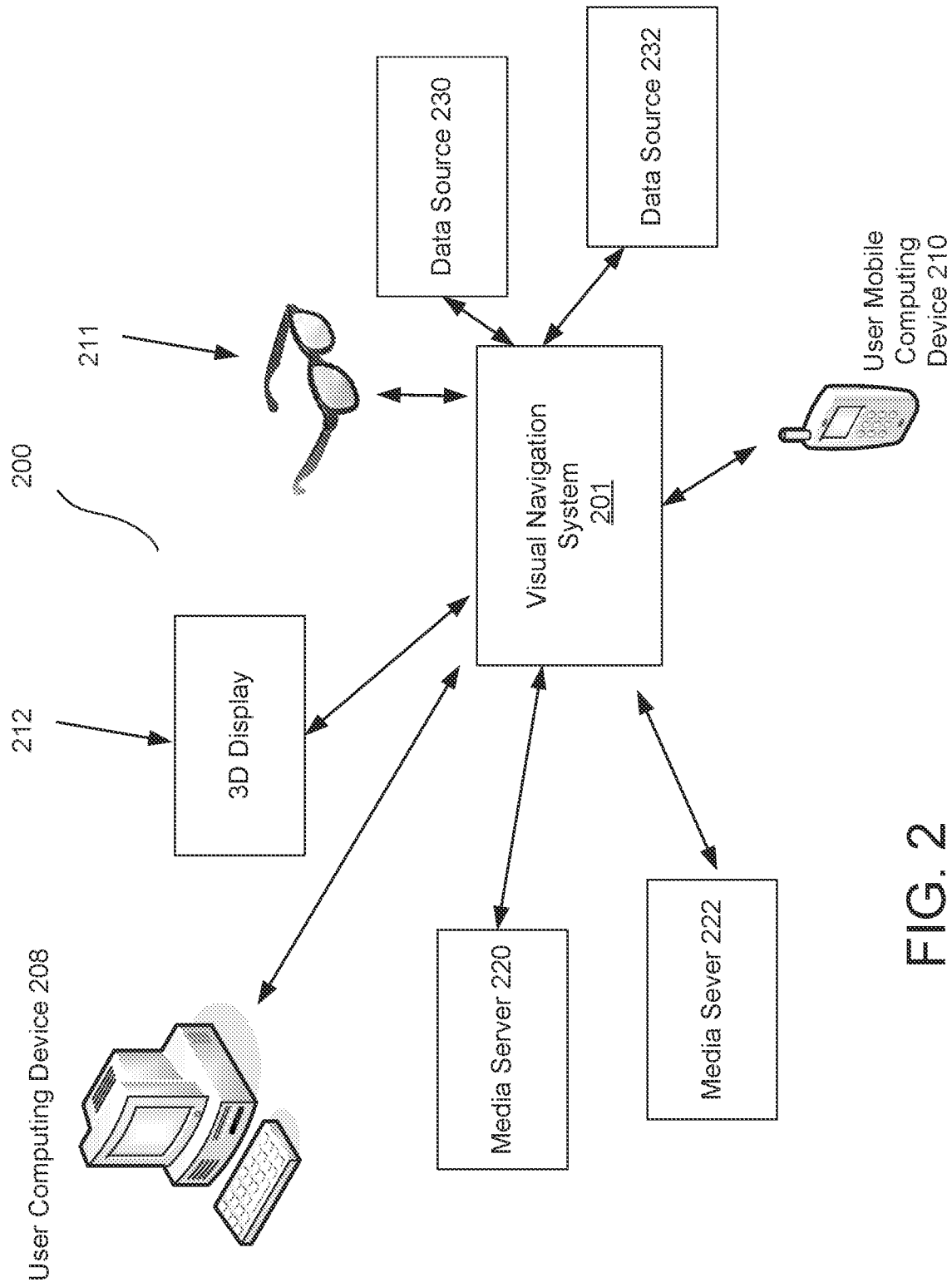
FIG. 2 shows a diagram illustrating the system architecture for a visual navigation system in accordance with one or more aspects described herein.

FIG. 2 shows a block diagram illustrating system architecture 200 for a visual navigation system. In some embodiments, the visual navigation system 201 may be implemented as part of a proxy server. In some other embodiments, the visual navigation system 201 may be implemented in a virtual private network (VPN) end point. In some embodiments, the visual navigation system 201 may be implemented as part of a cyber-security platform or as part of a digital safety framework. In some instances, the visual navigation system 201 may be a visual navigation device 100.

The visual navigation system 201 may collect information from, and transmit information to, a user through various different channels, such as via a user mobile computing device 210, or via a user computing device 208.

In some embodiments, visual navigation system 201 may be used with 3D glasses 211 and a 3D display 212. In an embodiment, left and right components (left and right video images) may be displayed to the user, who may be able to view the displayed left and right components using 3D glasses 211 or by other means. In some embodiments, 3D display device 212 may be physically separate from visual navigation system 201, and in other embodiments, 3D display device 212 may be physically integrated with visual navigation system 201.

Visual navigation system 201 may collect information from and transmit information to a user regarding their digital footprint. The information contained or utilized in determining the user's digital footprint may be found on different media websites and stored on media severs 220 and 222. For example, a user may send a request to visual navigation system 201 to collect any information regarding the user's digital footprint and display all information discovered to the user on 3D display 212 or visual navigation device 100.

In an embodiment, visual navigation system 201 provides data structure renderings and navigation tools to work with and understand a user's digital footprint including relationships with third parties and the connections from data within the footprint to the user's online relationships.

Figure 3:
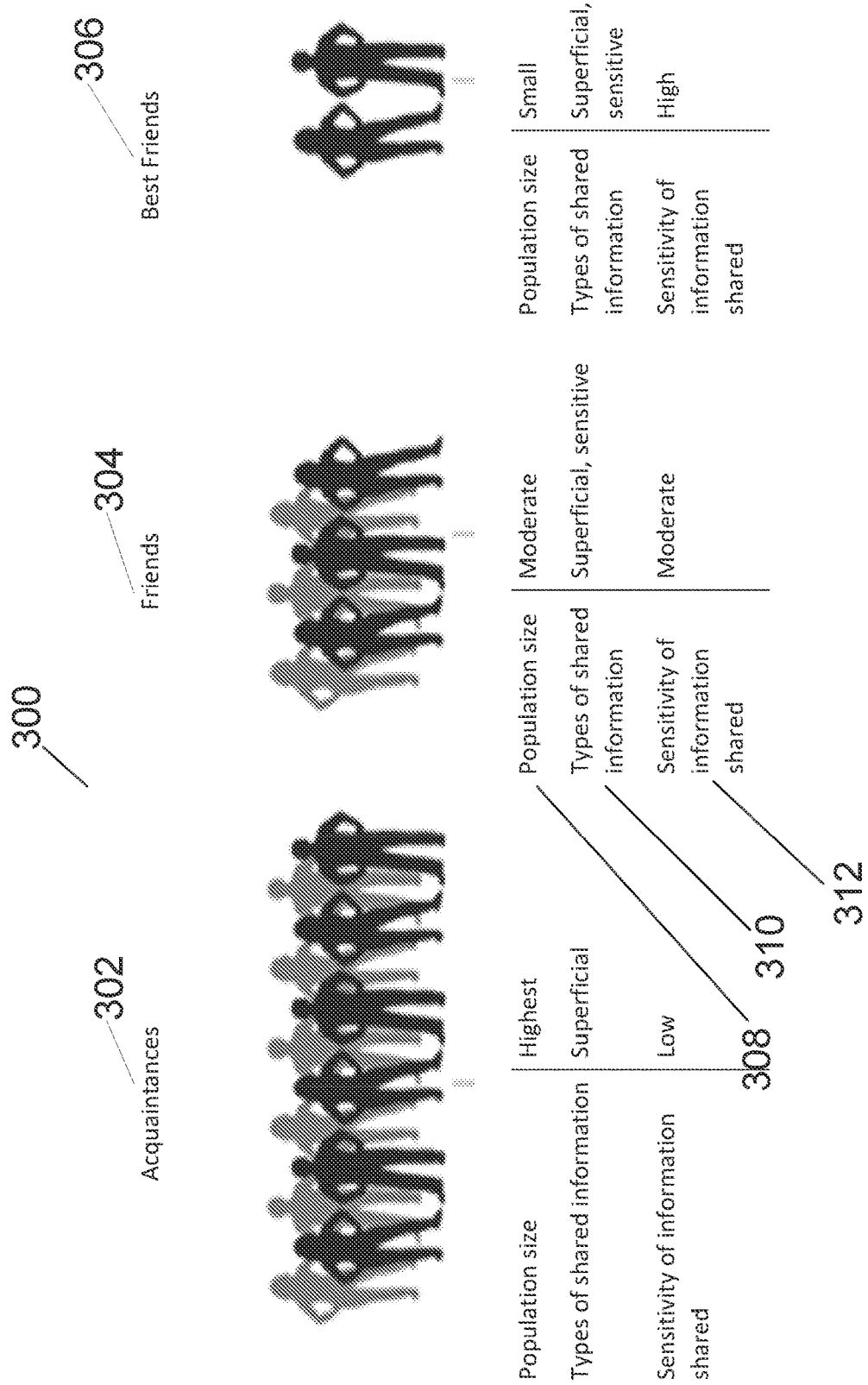
FIG. 3 illustrates an exemplary relationship framework in accordance with one or more aspects described herein.

FIG. 3 illustrates an exemplary relationship framework that may be used by visual navigation system 201 to classify a user's numerous online relationships with many different groups and entities. For instance, a user's numerous online relationships may be grouped into various categories such as acquaintances 302, friends 304, and best friends 306. Those skilled in the art will realize that other categories or groups may be added to the relationship framework based on a determination of additional or discovered categories by visual navigation system 201. In an embodiment, the various categories may contain distinguishing features based on attributes such as population size 308, types of shared information 310, and sensitivity of information shared 312.

For example, in an embodiment, visual navigation system 201 may determine that a user has 56 different accounts across a range of Internet services for which the user has 56 different relationships. In an embodiment, an account may include accounts such as bank accounts, social media accounts, digital storefronts, etc. In an embodiment, visual navigation system 201 may discover those accounts by analyzing source information for each email correspondence in a monitored email account of the user. Based on the determined source information for each email correspondence, visual navigation system 201 may generate a list of financial institutions associated with the user. Visual navigation system 201 may, in operation, also determine for each email correspondence a likelihood that each email correspondence represents a subscription of the user. Based on the determined likelihood that each email correspondence represents a subscription of the user, visual navigation system 201 may generate a list of subscriptions associated with the user.

In another embodiment, visual navigation system 201 may discover accounts by analyzing applications discovered on a user's phone or smart device with a user's permission. Such applications may include social media applications or application using social network logins. In addition, visual navigation system 201 may scan other sources such as social media accounts to discover relationships. The relationship may be determine from discovered metadata from third-party application connected to a user's profile.

Visual navigation system 201 may categorize each of these 56 different relationships into one of the frameworks categories (acquaintances 302, friends 304, and best friends 306). In an embodiment, accounts that are associated with financial institutions may have more value than accounts associated with entertainment websites or subscriptions. In an embodiment, accounts may be categorized based on type of account.

As illustrated in FIG. 3, the category of acquaintances 302 for a user's digital footprint may include the largest or highest number of contacts but the types of information shared with the those contacts may be superficial and be of low sensitivity. The category of friends 304 for a user's digital footprint may include a moderate number of contacts but the types of information shared with these contacts may be superficial/sensitive and be of moderation sensitivity. The category of best friends 306 for a user's digital footprint may include the smallest number of contacts but the types of information shared with those contacts may be superficial/sensitive and be of high sensitivity.

In an embodiment, visual navigation system 201 determines a user's relationships from analysis of numerous data collected or supplied regarding the user. Over time visual navigation system, 201 may learn both a user's and other consumers' specific and general population characteristics.

In an embodiment, visual navigation system 201 may indicate changes in the users' footprint (alerts, new discovery, no longer reachable connections etc.) as well as status changes in elements of the footprint. The may allow any visual cues to overlay the visual representation and act as action points to enter into more detail or start an interaction.

In an embodiment, visual navigation system 201 may include a canonical data model and a supervised machine-learning model for analyzing relationship data. For instance, exemplary website data may be tagged and used to build a classifier for analyzing subsequent websites that may collect similar relationship information regarding users.

In another embodiment, visual navigation system 201 may also move relationships between categories based on a determination that a particular relationship has changed. Changes to the categorization of a relationship may be displayed to the user. In an aspect of the disclosure, visual navigation system 201 may enable a user to move relationships into different or multiple relationship categories. Visual navigation system 201 may analyze the changes made by a user and determine that the user may also wish to modify other relationship classifications. Visual navigation system 201 may alert the user regarding the analysis to determine if the user wants visual navigation system 201 to make any additional relationship classification changes. In another embodiment, alerts may be used to indicate discovery of a new accounts. The alerts may be transmitted to a user.

FIG. 4 illustrates an expanded exemplary relationship framework that may be used by visual navigation system 201 to classify a user's numerous online relationships with many different groups and entities. As illustrated in FIG. 4, the categories of acquaintances 302, friends 304, and best friends 306 may also include an expanded list of features such as regularity of conversations 402, direction of conversations 404, and conversation channels 406. In an embodiment, each of the categories of acquaintances 302, friends 304, and best friends 306 may be further differentiated by the expanded list of features.

For instance, the category of acquaintances 302 for a user's digital footprint may also include regular, single direction conversations with friends where the most used forms of communication include in-person communication, email, phone, or letter. In an embodiment, this may be contrasted with the category of best friends 306 where conversations with best friends may be regular/occasional but the direction of conversation is bi-directional with an expended list of conversation channels including in-person communication, email, phone, text, letter, chat, IM and video.

In an embodiment, visual navigation system 201 may determine that additional features and/or attributes should be included in existing relationship categories. In an embodiment, those additional features may be added based on user's feedback received by visual navigation system 201.

In an embodiment, visual navigation system 201 may prioritize communications such as alerts, notifications, news, etc. to match a user's most important relationships. In an embodiment, a user may personalize preferences to adjust importance of individual relationships. Visual navigation system 201 may analyze a user's preferences to determine recommendations for a user to assist the user in being more productive. In an embodiment, visual navigation system 201 may utilize behavioral analytics to determine recommendations.

In an aspect of the disclosure, visual navigation system 201 may combine representational metaphors with dimensional structure to display the relationships of a user's digital footprint in an intuitive and convenient format. Visual navigation system 201 may enable a user to access their digital footprint on numerous mobile devices including but not limited to mobile phone, tablets, personal computers or smart televisions.

In an embodiment, visual navigation system 201 may display a user's digital footprint using an exemplary sphere with an overlaid network of nodes and connecting lines. In another embodiment, visual navigation system 201 may display a user's digital footprint using a carousel of options, menus and lists, or a set of concentric rings where distance from the center represents strength of relationship. In an embodiment, adjacent regions and surface areas may represent categories of information that can be expanded or contracted on the user interface by using actions such as point and click tap, press and hold, stretch, pinch, spin and swipe to provide additional detail. In another embodiment, depth (moving "into" an object) may represent timelines. For example, the history of an object can be deeper than the present position. In an additional embodiment, organizational viewpoints (categories, relationships, data items, connections) may be selected from a menu or carousel of choices and defaults can be chosen for the initial presentation of information.

As discussed above, the visual navigation system 201 may display strength of relationships for a user's digital footprint on the user interface. In an embodiment, the relationships that appear closest to the subject are the strongest and in one exemplary categorization framework may be called best friends. Additionally, in an embodiment, the relationships that are a little further away may be less strong but still important may be categorized as friends. Further, relationships that are further away from the subject may be categorized as acquaintances as a user may not interact often with them. In an embodiment, relationships that are furthest away from the subject may be categorized as strangers.

In an aspect of the disclosure, visual navigation system 201 may retrieve information related to a user. The information may be information from a plurality of information data sources 230, 232 or media servers 220, 222 in order to determine the digital footprint of a user. A data retrieval engine may be configured to monitor (e.g., continuously monitor) each of the information data sources 230, 232 and media servers 220, 222 and report data of interest from any one of these data sources to the visual navigation system 201. For example, the data retrieval engine may monitor social media sources to determine if account information or relationship information is associated with the user is detected. If information is detected, it may be passed to visual navigation system 201 for analysis. In another example, the data retrieval engine may interface with one or more digital accounts (banking accounts, social media accounts, digital storefronts, etc.) Account information may be passed on to visual navigation system 201.

In some embodiments, visual navigation system 201 may monitor user activity on social media networks, the Internet in general, or the dark web (e.g., network-enabled websites with restricted addresses or accessibility such that the sites are not accessible using standard means, such as websites with no domain names that are hidden from online search engines). In some instances, visual navigation system 201 may determine how much of a user's confidential (e.g., private) information is available electronically. Confidential information may comprise identity information such as name or birthday, marital status, family members, education, employment histories, online identities (e.g., user names on a social media account), financial information (e.g., banking numbers, credit card numbers, etc.), traceable assets (real estate, vehicles, etc.), court records, or other such information. By searching for electronically available information, the system may determine a "digital footprint" (e.g., a trail of data and information, available electronically and associated with the user). For example, visual navigation system 201 may determine that a user's home address is available on three social media sites, five public web pages, and two dark web pages. The visual navigation system 201 may also search for instances where confidential information has become available. For example, visual navigation system 201 may further determine that one of the dark web pages has a credit card ending in "XXXX" associated with the user's address.

In some embodiments, in addition to collecting user information from mobile applications and web applications, user information may be collected from various other channels such as user computing device 208, user mobile computing device 210, and internet connected devices.

In some embodiments, an account information system may maintain and dynamically update records of accounts for a user. For example, an account information system may interface with social networking accounts associated with the user.

In an embodiment, the collected information regarding a user may be used to determine an online presence for a user (e.g., the spread of information or "footprint" left by a user in digital spaces). In an embodiment, determined social media sources of the user may be monitored to determine if something malicious or believed to breach the terms of use of the site has been detected. Such monitoring may detect unauthorized use of a user's social media accounts.

In an embodiment, visual navigation system 201 may generate a user profile. The user profile may be generated using at least in part data received and/or collected from information data sources 230, 232 and media servers 220, 222. The user profile may include details of the user including but not limited to a user's name, age, address, driver's license number, credit card or bank information, insurance policies, networked devices associated with the user etc. In an embodiment, a user may themselves enter additional or confirm information found in their user profile through a mobile application or computing device interface. Additional information that may be entered by the user includes financial account details and/or verification of online accounts used by the user. In an embodiment, a user's profile may be compared to other users' profiles to determine preferences that may be of interest to users with similar profiles.

In an aspect of the disclosure, visual navigation system 201 may analyze all of the collected user data and determine a user's digital footprint. In an embodiment, each determined relationship for a user may be categorized based on the a combination of 1) frequency of contact; 2) recency of contact and length of relationship; 3) nature of related party (financial, commercial, informational, etc.), 4) known likelihood of membership in a category, and 5) forced ranking to maintain category size (one may be limited to have only a predetermined number of "best friends"). In an embodiment, additional factors that may be used to categorize a determined relationship include amount of time spent on a particular website and how often a user visits a website.

In an aspect of the disclosure, categorization approaches may be improved as observations of the reclassifications are analyzed. In an embodiment, the visual navigation system 201 may filter information to show individual categories as well as the history of movement between categories for any specific relationship.

In a further aspect of the disclosure, the digital footprint visualization may be expanded to show more granular detail to expose more information about each feature, either as an associated information card, list, or as an augmented reality (AR) overlay. In an embodiment, as different objects are selected, the displayed information changes accordingly and automatically. Changes via selections from a list may cause the point of focus of the representational model to change synchronously.

Figure 5:
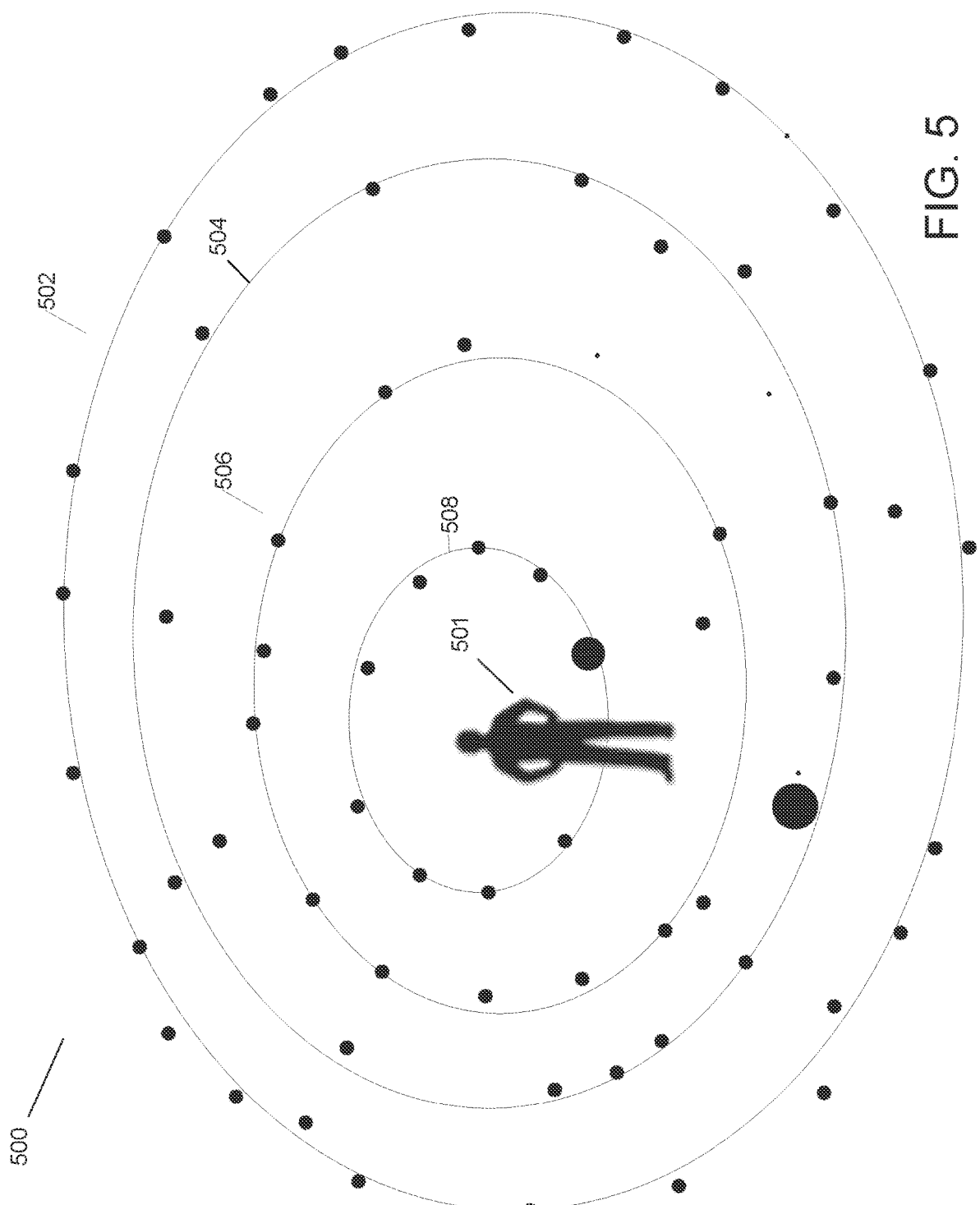
FIG. 5 illustrates an exemplary user interface in accordance with an embodiment of the disclosure.

FIG. 5 illustrates an exemplary user interface 500 in accordance with an embodiment of the disclosure. In FIG. 5, a relationship framework for a user may be displayed as a series of four concentric rings 502, 504, 506, and 508. In an embodiment, user interface 500 provides a visual depiction to user 501 of those digital relationships that are more significant or less significant through use of concentric rings 502, 504, 506, and 508. In an embodiment, the distance from the center to each concentric ring represents the strength of the digital relationship. Those skilled in the art will realize that the concentric rings shown in FIG. 5 are exemplary and may or may not be displayed to the user. In an embodiment, a user may toggle the illustrated concentric rings on/off on the display.

For example, user interface 500 concentric ring 508 may represent strong digital relationships to user 501 as those accounts, websites, subscriptions etc. are closest to user 501 who is located in the center of user interface 500. In an embodiment, the financial accounts, medical accounts, social media websites, subscriptions, etc. located in concentric ring 508 may be analogized to best friends, as those relationships are the strongest. In an embodiment, concentric ring 508 may only include a small amount of digital relationships (typically less than 10-12).

In another embodiment, concentric ring 506 which is represented a little further distance from user 501 illustrates digital relationships which are not as strong as best friends but are still important to the user. In an embodiment, ride sharing accounts, browsing history data, social media websites, subscriptions etc. located in concentric ring 506 may be analogized as friends. In an embodiment, concentric ring 506 may include a larger amount of digital relationships (typically 100-120).

In yet another embodiment, concentric ring 504 which is represented a further distance from user 501 illustrates digital relationships which are weaker than friends but still useful to user 501. In an embodiment, marketing emails, educational content, old subscriptions not utilized in a long time, etc. located in concentric ring 504 may be analogized as acquaintances as user 501 needs to know about them but does not interface with them often.

In another embodiment, concentric ring 502, which is represented the furthest distance from user 501, illustrates digital relationships that are weak. In an embodiment, user 501 may not even remember there existence. In an embodiment, junk mail etc. located in concentric ring 502 may be analogized to strangers as user 501 may have to ask themselves question such as why these digital relationships exist, or what does this entity know about user 501.

Figure 6:
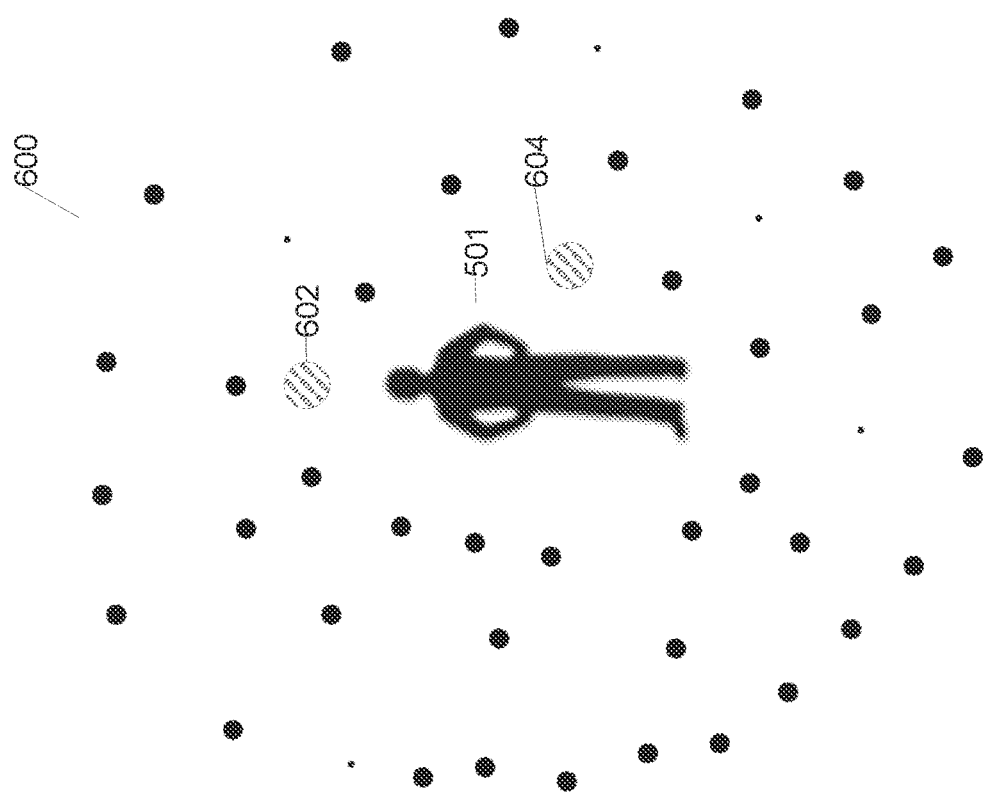
FIG. 6 illustrates an additional exemplary user interface m accordance with an embodiment of the disclosure.

FIG. 6 illustrates an additional exemplary user interface 600 in accordance with an embodiment of the disclosure. In FIG. 6, a relationship framework for a user may indicate a breach or other intrusion into a user's relationship framework. For example, nodes 602 and 604 may illustrate to user 501 that particular financial accounts have been hacked or breached. For instance, node 602 may represent user's 501 bank account which is indicated as having been recently hacked. In another example, node 604 may represent user's 501 credit card account which is indicated as having been recently compromised or breached. For example, user 501 credit card account may have been discovered on the dark web. These breaches or intrusions may be illustrated on user interface 600 in a manner that graphically depicts the importance of these threats to user 501.

In an aspect of the disclosure, visual navigation system 201 may through interface 600 provide user 501 with information regarding best methods for handling the breach.

In another embodiment, visual navigation system 201 may automatically take action to handle the breach or prevent further damage.

Figure 7:
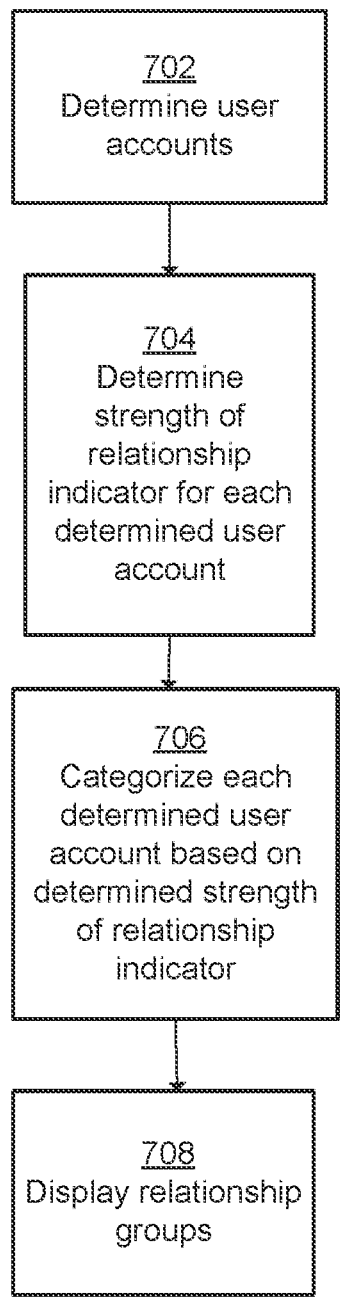
FIG. 7 illustrates determining digital relationship strengths for a user's digital footprint in accordance with an aspect of the disclosure.

FIG. 7 illustrates determining digital relationship strengths for a user's digital footprint in accordance with an aspect of the disclosure. Aspects of FIG. 7 are also directed to data capture, display, transmission and/or use performed with permission of the user. In step 702, visual navigation system 201 may determine for a plurality of items of email correspondence, a likelihood that each item of email correspondence represents an account of a user. In step 704, visual navigation system 201 may be based on the determined likelihood that each item of email correspondence represents an account of the user, determine a strength relationship indicator for each of the accounts of the user. In step 706, visual navigation system 201 may categorize each of the accounts of the user based on the determined strength relationship indicator into a plurality of relationship groups. In step 708, visual navigation system 201 may display on a user interface the relationship groups.

Aspects of the invention have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

What is claimed is:

1. A method comprising:
   determining, by a computer, a plurality of accounts of a user by analyzing one or more applications on a mobile phone and determining a plurality of businesses, each interacted with by at least one analyzed application;
   determining, by the computer, a category, from a predefined schema of categories, for each account of the plurality of accounts, wherein the category is based at least in part on a sensitivity of information shared via interactions with a respective business using the at least one analyzed application, the sensitivity determined based at least on a type of the respective business, wherein the schema classifies categories corresponding to at least low, moderate and high sensitivity information shared via the account, and wherein the determining includes determining at least one of the plurality of accounts in each category of the categories; and
   displaying, by the computer and on a user interface, identifiers corresponding to the plurality of accounts, wherein the identifiers are displayed in groups according to the category.

2. The method of claim 1, wherein the applications comprise at least social media applications.

3. The method of claim 2, wherein the categories of the schema includes at least acquaintances, friends, and best friends.

4. The method of claim 3, wherein the acquaintances comprise accounts sharing information having a low sensitivity, the friends comprise accounts sharing information having a moderate sensitivity, and the best friends comprise accounts sharing information having a high sensitivity.

5. The method of claim 3, wherein identifiers corresponding to the acquaintances, identifiers corresponding to the friends, and identifiers corresponding to the best friends are displayed with decreasing distance from an identifier of the user, with the identifiers corresponding to the acquaintances being displayed farthest from the identifier of the user and with the identifiers corresponding to the best friends being displayed closest to the identifier of the user.

6. The method of claim 1, further comprising:
after displaying the identifiers, receiving, by the computer, a request to change a categorization of one account; and
displaying, by the computer and on the user interface, the identifiers corresponding to the accounts, wherein an identifier corresponding the one account is displayed according to the changed categorization.

7. The method of claim 1, wherein the category is based at least in part based on at least one of frequency of communication, directionality of communication, or a number of channels used for communication with the respective business.

8. A method comprising:
determining, by a computer, a plurality of accounts of a user by analyzing at least one email application on a mobile phone and determining a plurality of businesses, each interacted with by the at least one email application;
determining, by the computer, a category, from a predefined schema of categories, for each account of the plurality of accounts, wherein the category is based at least in part on a sensitivity of information shared via interactions with a respective business using the at least one analyzed email application, the sensitivity determined based at least on a type of the respective business, wherein the schema classifies categories corresponding to at least low, moderate and high sensitivity information shared via the account, and wherein the determining includes determining at least one of the plurality of accounts in each category of the categories; and
displaying, by the computer and on a user interface, identifiers corresponding to the plurality of accounts, wherein the identifiers are displayed in groups according to the category.

9. The method of claim 8, wherein the categories of the schema include at least acquaintances, friends, and best friends.

10. The method of claim 9, wherein the acquaintances comprise accounts sharing information having a low sensitivity, the friends comprise accounts sharing information having a moderate sensitivity, and the best friends comprise accounts sharing information having a high sensitivity.

11. The method of claim 9, wherein identifiers corresponding to the acquaintances, identifiers corresponding to the friends, and identifiers corresponding to the best friends are displayed with decreasing distance from an identifier of the user, with the identifiers corresponding to the acquaintances being displayed farthest from the identifier of the user and with the identifiers corresponding to the best friends being displayed closest to the identifier of the user.

12. The method of claim 8, further comprising:
after displaying the identifiers, receiving, by the computer, a request to change a categorization of one account; and
displaying, by the computer and on the user interface, the identifiers corresponding to the accounts, wherein an identifier corresponding the one account is displayed according to the changed categorization.

13. The method of claim 8, wherein the category is based at least in part based on at least one of frequency of communication, directionality of communication, or a number of channels used for communication with the respective business.

14. A method comprising:
determining, by a computer, a plurality of accounts of a user by analyzing at least one email or social media application on a mobile phone and determining a plurality of businesses, each interacted with by the at least one email or social media application;
determining, by the computer, a category, from a predefined schema of categories, for each account of the plurality of accounts, wherein the category is based at least in part on a number of channels used for communication with a respective business, indicated at least in part by a number of the analyzed at least one email or social media application used for communication with the respective business, and including at least communications via the analyzed at least one email or social media application, wherein the schema classifies categories corresponding to at least three levels of relationship strength, and wherein the determining includes determining at least one of the plurality of accounts in each category of the categories; and
displaying, by the computer and on a user interface, identifiers corresponding to the plurality of accounts, wherein the identifiers are displayed in groups according to the category.

15. The method of claim 14, wherein the categories of the schema include at least acquaintances, friends and best friends.

16. The method of claim 14, wherein the category is based at least in part on the number of channels used for communication and wherein a weaker level of relationship strength defined by the schema includes use of fewer communication channels than a stronger level of relationship strength.

17. The method of claim 14, wherein the category is based at least in part on a directionality of communication and wherein a weaker level of relationship strength defined by the schema includes fewer bi-directional communication channels than a stronger level of relationship strength.

18. The method of claim 14, wherein the category is based at least in part on a frequency of communication and wherein a weaker level of relationship strength defined by the schema includes fewer communications than a stronger level of relationship strength.

19. The method of claim 1, wherein the computer includes at least one of a personal computer, a server, a laptop computer, a tablet, a smartphone, or a vehicle computer.

* * * * *